US011031999B1

(12) United States Patent  
Liu et al.

(10) Patent No.: US 11,031,999 B1  
(45) Date of Patent: Jun. 8, 2021

(54) NARROW-BAND IOT AND LTE OVER SATELLITE

(71) Applicant: Lockheed Martin Corporation, Bethesda, MD (US)

(72) Inventors: Xiangdong Liu, Boyds, MD (US); Dilip S. Gokhale, Germantown, MD (US); Suresh K. Iyer, Germantown, MD (US); Muthuthamby Sreetharan, Bethesda, MD (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 16/703,777

(22) Filed: Dec. 4, 2019

(51) Int. Cl.
| | |
|---|---|
| *H04B 7/185* | (2006.01) |
| *H04W 84/04* | (2009.01) |
| *H04W 74/00* | (2009.01) |
| *H04W 56/00* | (2009.01) |
| *H04W 80/02* | (2009.01) |
| *H04L 29/06* | (2006.01) |
| *H04W 72/10* | (2009.01) |
| *H04L 29/08* | (2006.01) |
| *H04W 76/27* | (2018.01) |
| *H04L 1/18* | (2006.01) |
| *H04W 36/18* | (2009.01) |

(52) U.S. Cl.
CPC ..... *H04B 7/18513* (2013.01); *H04B 7/18541* (2013.01); *H04L 1/1812* (2013.01); *H04L 65/608* (2013.01); *H04L 67/322* (2013.01); *H04W 36/18* (2013.01); *H04W 56/004* (2013.01); *H04W 56/006* (2013.01); *H04W 72/10* (2013.01); *H04W 74/006* (2013.01); *H04W 76/27* (2018.02); *H04W 80/02* (2013.01); *H04W 84/045* (2013.01)

(58) Field of Classification Search
CPC ............. H04B 7/0632; H04B 7/18528; H04B 7/18513; H04B 7/18517; H04B 7/18534; H04B 7/18541
See application file for complete search history.

(56) References Cited

U.S. PATENT DOCUMENTS

2016/0278033 A1*  9/2016  Wu ................... H04B 7/18513

* cited by examiner

*Primary Examiner* — Keith Ferguson  
(74) *Attorney, Agent, or Firm* — Morgan, Lewis & Bockius LLP (57) ABSTRACT

A satellite communication system includes a satellite, a satellite base station, and a user device. The satellite supports a number of satellite beams. Each satellite beam includes a number of cells. The satellite base station can communicate with the satellite via a feeder link. The user device is in communication with the satellite and the satellite base station. The user device can select a cell that covers a location of the user device based on a cell contour and a quality of a downlink signal received from the satellite base station. The satellite communication system can be operated by using LTE and/or NB-IoT standards, protocols, and/or waveforms.

20 Claims, 6 Drawing Sheets

NARROW-BAND IOT AND LTE OVER SATELLITE

STATEMENT REGARDING FEDERALLY SPONSORED RESEARCH OR DEVELOPMENT

Not Applicable.

FIELD OF THE INVENTION

The present invention generally relates to satellite communication and, more particularly, to a narrow-band internet-of-things (IoT) over-satellite system based on long-term evolution (LTE) technology.

BACKGROUND

There is significant interest in using the fourth-generation (4G) long term evolution (LTE) physical layer over satellite links. Mobile satellite networks are increasingly assessing the use of LTE as the air interface (radio access technology) for next-generation systems. Using the widely deployed field-proven LTE physical layer, in conjunction with associated layer 2 and layer 3 radio-access technologies, can be very beneficial for satellite networks. LTE technology provides several benefits, for example, seamless support for 4G and/or evolved packet system (EPS)-based services, a range of standardized modulation and coding schemes and standardized resource definitions (e.g., frequency and time) that are well suited for 4G and/or EPS services.

Existing LTE-over-satellite technology requires a minimum of 1.2 MHz of spectrum to be allocated in each satellite beam, and further requires a user terminal to have sufficient power and/or antenna performance to transmit with a bandwidth of at least 180 kHz. A number of service providers have expressed a great interest in LTE-over-satellite deployments. Currently, Internet of Things (IoT) services (e.g., asset tracking, meter reading, connected cars) are provided on narrower band carriers (e.g., 200 kHz) to support network connectivity to a large number of low-power, low-duty cycle, and low-cost devices.

The third generation partnership project (3GPP) provides standardized narrow-band IoT (NB-IoT) specifications as an extension to, and reuses much of, LTE technologies. The NB-IoT operates on 200 kHz carriers and provides several uplink bandwidths, such as 180, 90, 45, 15, and 3.75 kHz, for user terminals depending upon terminal capability and traffic needs. However, the NB-IoT specifically targets services to a large number of low-power, low-duty cycle, and low-cost devices, and several LTE capabilities are not supported over NB-IoT. For instance, user terminal mobility, resource-efficient voice service, and high-data rate schemes such as high-order modulation (e.g., 16-quadrature amplitude modulation (QAM) and 64-QAM), full duplex, and carrier aggregation.

SUMMARY

According to various aspects of the subject technology, methods and configuration for providing a narrow-band internet of things (NB-IoT) over satellite are disclosed. The subject disclosure modifies the NB-IoT technology to support geosynchronous orbit (GEO) satellite operations and long-term evolution (LTE) services, while being able to support NB-IoT services over GEO satellite.

In one or more aspects, a satellite communication system includes a satellite, a satellite base station and a user device. The satellite supports a number of satellite beams. Each satellite beam includes a number of NB-IoT carriers (i.e. cells). The satellite base station can communicate with the satellite via a feeder link. The user device is in communication, via the satellite, with the satellite base station. The user device can select a carrier (i.e. a cell) that covers a location of the user device based on a cell geographic contour and a quality of a downlink signal received from the satellite base station. The user device can further achieve time synchronization with the satellite base station in the return direction overcoming a long UE-to-eNode delay within the selected cell.

In other aspects, a method of providing an NB-IoT-over-satellite system includes configuring a satellite to support a plurality of satellite beams. The method further includes a satellite base station that generates, via the satellite, one or more carriers (i.e. cells) in each beam. The method further includes configuring a satellite base station to communicate via the satellite with the satellite base station, selecting a cell of the multiple cells that covers a location of the user device based on a cell contour and a quality of a downlink signal received from the satellite base station, and performing time synchronization with the satellite base station in a return direction overcoming a long UE-to-eNodeB time delay within the selected cell.

In yet other aspects, a satellite base station includes a processor circuit configured to perform a number of actions including controlling communications via a satellite with a user device using an NB-IoT protocol, determining in real time a modulation and coding scheme (MCS) based on capabilities of the user device and/or location conditions, and supporting user-device beam-to-beam handovers to provide service connectivity for the user device.

The foregoing has outlined rather broadly the features of the present disclosure so that the following detailed description can be better understood. Additional features and advantages of the disclosure, which form the subject of the claims, will be described hereinafter.

BRIEF DESCRIPTION OF THE DRAWINGS

For a more complete understanding of the present disclosure and the advantages thereof, reference is now made to the following descriptions to be taken in conjunction with the accompanying drawings describing specific aspects of the disclosure, wherein.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block-diagram form in order to avoid obscuring the concepts of the subject technology.

In some aspects of the present technology, methods and configuration are disclosed for providing a narrow-band internet-of-things (NB-IoT) over-satellite technology. The present disclosure modifies the NB-IoT technology to support geosynchronous orbit (GEO) satellite operations and long-term evolution (LTE) services, while also being able to support NB-IoT services over GEO satellite.

It is advantageous to reuse and retain as much as possible the terrestrial LTE and NB-IoT design in the disclosed NB-IoT-over-satellite technology, and to make modifications only when necessary for the satellite environment. Doing so allows maximal reuse of terrestrial NB-IoT equipment and product components and minimizes system development and deployment cost. The NB-IoT-over-satellite technology can be deployed together with LTE-over-satellite to give a satellite operator the flexibility to use different-sized carriers compatible with available spectrum on a per beam basis, and to provide a wide range of types of services to a wide range of terminal classes of different capabilities. As IoT development and deployment is picking up industrywide momentum, and with LTE-over-satellite as a backdrop, NB-IoT-over-satellite technology can be a pioneer in fourth generation (4G) and fifth generation (5G) over-satellite solutions for commercial as well as military applications. In the following description, we will describe specific modifications to terrestrial NB-IoT to achieve the objects of this disclosure.

In cellular technology and for frequency division duplexing (FDD), a cell is covered by two paired carriers, one downlink and one uplink, to provide bidirectional user services. For any given geographical location, multiple cells may be deployed to accommodate a high volume of traffic. With LTE-over-satellite or NB-IoT-over-satellite technology, multiple cells may be deployed in the same satellite beam.

Figure 1:
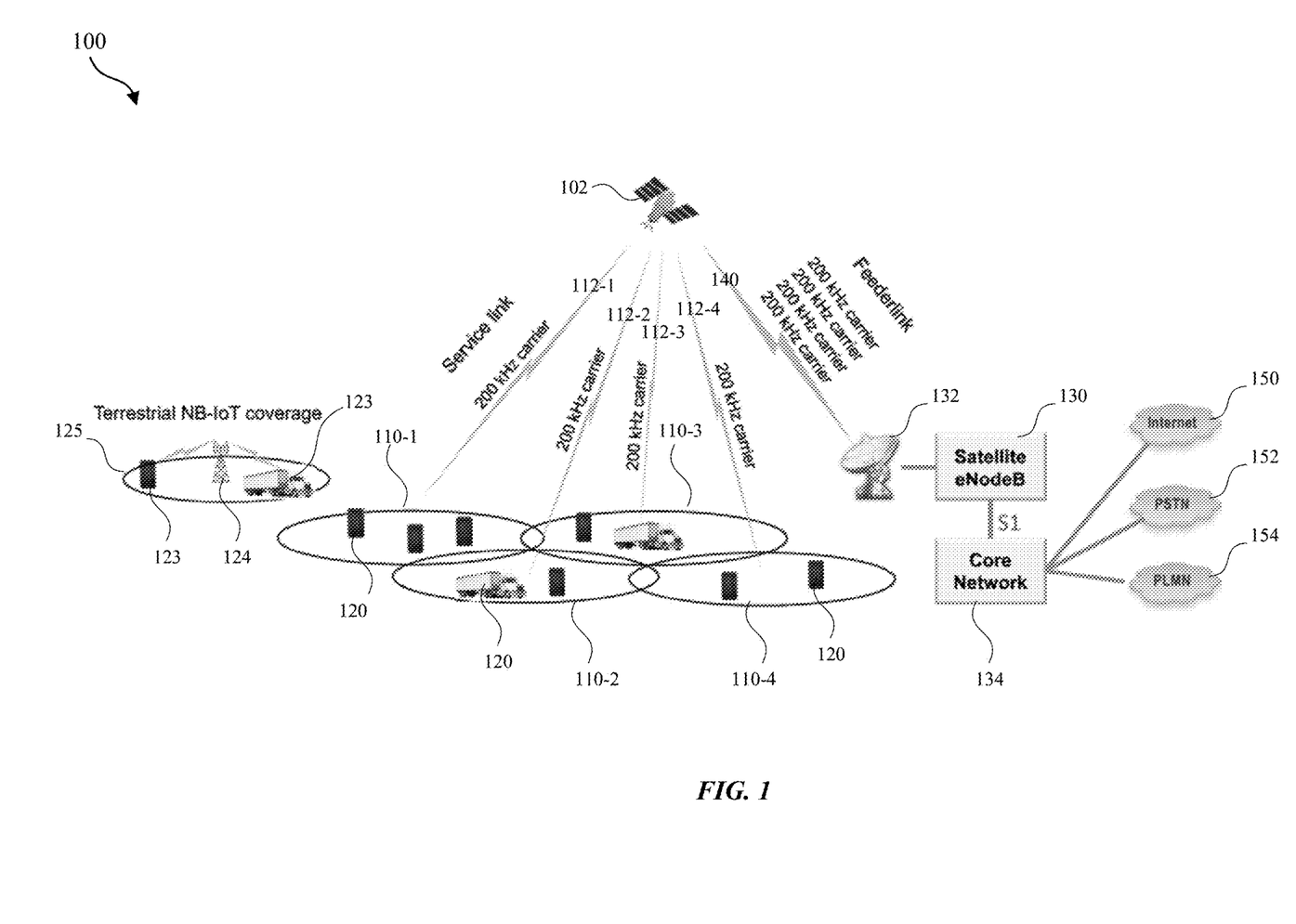
FIG. 1 is a high-level diagram illustrating example environments for deployment of a narrow-band internet-of-things (NB-IoT)-over-satellite system, according to certain aspects of the disclosure.

FIG. 1 is a high-level diagram illustrating an example environment 100 for deployment of an NB-IoT-over-satellite system, according to certain aspects of the disclosure. The environment 100 includes a space vehicle 102 (e.g., a satellite), user equipment (UEs) 120 (also referred to as terminal devices), a multicell satellite base station (e.g., eNodeB) 130, a satellite antenna 132 (e.g., a reflector antenna, such as a dish antenna), and a core network 134, which is communicatively coupled to a number of networks such as the Internet 150, a public switched telephone network (PSTN) 152 and a public land mobile network (PLMN) 154. The UEs 120 are located within satellite cells 110 (110-1, 110-2, 110-3 and 110-4) and receive NB-IoT-over-satellite service from the satellite 102 via a number of LTE communication channels 112 (112-1, 112-2, 112-3 and 112-4) (e.g., 200 kHz carrier channels). In some implementations, each satellite beam may have a number of cells (not shown in FIG. 1 for simplicity). Examples of the UEs 120 include hand-held communication devices or automotive communication devices. Also shown in FIG. 1 is a terrestrial NB-IoT cell 125 including a terrestrial base station 124 and UEs 123, which receive terrestrial NB-IoT service from the terrestrial base station 124, and when they move out of the coverage of the terrestrial base station 124, the extended services from the NB-IoT-over-satellite system, such as explicit mobility, carrier aggregation, and full duplexity.

The satellite eNodeB 130 is coupled to the satellite antenna 132 that communicates with the satellite 102 via a feederlink 140. In some aspects, the satellite eNodeB 130 is a multicell (multibeam) base station and may include, among other components and modules, a communication processor. In some implementations, the communication processor is a specialized processor that is configured to perform one or more functionalities of the satellite eNodeB 130 with respect to the subject disclosure. The feederlink 140 includes a number of 200 kHz carriers. Using the widely deployed, field-proven LTE physical layer in conjunction with its associated Layer 2 and 3 technologies can be very beneficial for satellite networks. Examples of these benefits include seamless support of evolved packet core (EPC) services to end users, interoperability with service provider core networks, a well-defined paradigm for resource management and the ability to leverage commercial-off-the-shelf (COTS) LTE technologies and products.

In NB-IoT acquisition random-channel access (RACH) process, each of the UEs 120 transmits a series of bursts, such as physical RACH (PRACH) preambles, toward an eNodeB in a time window (PRACH slot). The eNodeB 130 measures the time delay from the UE 120 to the eNodeB 130 from the series of preambles and provides the delay, called timing advance (TA), back to the UE 120. The UE 120 applies this TA by adjusting its subsequent transmissions toward the eNodeB 130. The subsequent transmissions thus arrive at eNodeB 130 in time slots per eNodeB 130 allocation, achieving initial timing synchronization. The NB-IoT RACH process is designed for a UE-to-eNodeB time delay of no more than about 133.7 microseconds, or about 40 km cell size. In a GEO satellite system, UE-to-eNodeB time delay is ordinarily above 238 milliseconds, which is many times larger than the NB-IoT RACH process maximum delay.

To overcome the large UE-to-eNodeB time delay and to reuse the NB-IoT RACH process, including the PRACH preambles, this disclosure requires a UE 120 to be equipped with a global-navigation satellite system (GNSS) receiver that can report accurate calendar time (e.g., global positioning system (GPS) time) to within a few microseconds and to use this capability to measure the delay between itself and the eNodeB 130 to arrive at a self-determined TA. The UE 120 then applies this TA to its PRACH preamble transmission time, such that the PRACH preambles arrive at eNodeB 130 with only a few microseconds timing error, as if the UE 120 is only no more than a few kilometers away from the eNodeB 130. The eNodeB 130 and the UE 120 then complete the normal NB-IoT RACH process. The NB-IoT technology uses a system frame number (SFN) as a means for time reference. Each frame is about 10 milliseconds and is associated with an SFN. From the narrow-band physical broadcast channel (NPBCH) information of a downlink broadcast, the UE 120 ordinarily determines the SFN of each particular broadcast burst. Within this disclosure, a convention is established to link NB-IoT SFN to calendar time. In particular, SFN=0 is defined to correspond to, for example, GPS time 2020 Jan. 1—00:00:00 at satellite eNodeB 130. A satellite eNodeB 130 has to ensure that its downlink transmission follows the convention in numbering SFNs (and their encoding in NPBCH). With GPS time reference, a UE 120 is to measure the arrival calendar time of any arbitrary downlink NPBCH burst. The UE 120 has next to determine, from the NPBCH SFN, the transmission time of the NPBCH burst. The UE 120 then has to calculate the satellite eNodeB 130-to-UE time delay as the difference between the NPBCH-burst arrival time and transmission time.

Uplink-frequency synchronization in NB-IoT is designed for stationary and slow-moving UEs. The frequency drift at a receiver, either a UE or an eNodeB 130, relative to nominal frequency value, is expected to be no more than a few tens of Hz. In a GEO satellite communication system, the UEs 120, the satellite 102, and the eNodeB 130 experience Doppler frequency shift; that is, the receive frequency is different from the frequency at which the signal was transmitted. To conserve energy for station keeping, a GEO communications satellite for mobile users is typically operated to allow the orbit to become inclined over the life of the satellite 102, for example, by as much as six degrees (in the north-south direction). For a stationary UE at about 60 degrees latitude and a nominal carrier frequency of about 1.7 GHz, Doppler shift can be as high as 250 Hz. A UE 120 receiving LTE services may be of an airborne type, with a speed of 1,000 km/hr relative to the ground. Combined with the satellite motion, Doppler shift can be as high as 1,750 Hz at 60 degrees latitude. In the downlink direction, since the satellite 102 is the only transmitter, the Doppler shift is ordinarily not an issue as all carriers are shifted in a similar manner. Each UE 120 can scan, lock on, and track a downlink carrier even if the receive frequency deviates from the nominal value. In the uplink direction, however, multiple UEs may transmit toward the satellite 102 at the same time, and, depending on their respective locations and speeds, the transmitted carriers may arrive at the satellite 102 with different Doppler shifts.

If all of the UEs 120 transmit uplink carriers at nominal frequency values, the receive frequencies at the satellite 102 may deviate from the nominal values by different amounts. The different uplink carriers may overlap in frequency, creating interference to each other, at the satellite 102. Also, the satellite 102 is ordinarily not designed to track uplink transmission by individual UEs 120. If the satellite performs channelization of uplink signals (for bandwidth-to-beam allocation flexibility, for example), different Doppler shift per carrier and per UE means that a carrier may be truncated in frequency by the satellite channelizer. There is a need for uplink-frequency synchronization, such that each UE 120 transmitted carrier arrives at satellite 102 at (close to) nominal frequency. In the subject disclosure, each UE 120 is equipped with a GNSS receiver that also serves as an accurate reference frequency source to within a few Hz. The UE 120 has to measure the locked-on downlink-carrier receive frequency and compare it with the nominal value to arrive at a frequency offset.

The frequency offset is primarily the (combined) Doppler shift between the UE 120 and the satellite 102 in the downlink direction, plus frequency errors along the downlink path. The UE 120 next calculates an uplink-carrier frequency offset. The UE 120 then transmits uplink carrier at nominal frequency subtracted by the uplink-frequency offset. Whenever a UE 120 transmits toward the satellite 102, the UE 120 is to perform the above procedure to determine transmit frequency. This includes the PRACH preambles. If a UE 120 continuously transmits toward the satellite 102, for example, during a long voice session, the UE 120 is to perform the above procedure in the order of once every 30 seconds to track the UE 120 direction of motion. Note that the above uplink-frequency synchronization procedure is only performed at the UEs. It is recognized that for certain classes of stationary UEs 120, such as the IoT devices, uplink frequency synchronization is not needed if the following three conditions are met: (a) the satellite 102 and the satellite eNodeB 130 can be designed to tolerate, for example, 200 Hz of frequency errors; (b) the deployment of such a UE class is restricted to, for example, below about 40 degrees latitude and (c) the operating frequency is at, for example, 1.7 GHz.

It will be understood that methods and mechanisms described herein for uplink frequency synchronization are applicable to an LTE-over-Satellite system and that such an application is within the scope of the present disclosure.

There is also Doppler shift on carriers transmitted between the satellite 102 and an eNodeB 130 that needs to be compensated as well. A feeder-link Doppler compensation is ordinarily done in many satellite communications (SATCOM) systems and is thus not part of this disclosure.

Hybrid automatic repeat request (HARQ) is a technique used in terrestrial LTE and NB-IoT channels to provide low-level delivery acknowledgement of packets between the UE 120 and the eNodeB 130. The HARQ has strict timing requirements that cannot be met with satellite access (given the long propagation delay). The present disclosure eliminates the use of HARQ retransmission processes, and the resiliency of packet transport is provided by the use of proper modulation and coding scheme (MCS) selection. To compensate for not using HARQ retransmission at the physical layer, the selection of modulation and coding schemes (MCSs) for NB-IoT-over-satellite technology is set for the operating point of achieving about 1% to 0.1% block-error ratio (BLER), instead of a terrestrial NB-IoT setting of about 10%. The goal for NB-IoT-over-satellite MCS selection is to deliver transport blocks from physical layer to link layer at an error ratio of about 1% to 0.1%, the same as terrestrial NB-IoT, so that no change is needed in an upper-layer retransmission mechanism for operating over satellite.

To minimize the changes to the NB-IoT physical layer, in particular, no change to forward-error correction (FEC) and rate-matching processing, redundancy version 0 (RV0) of each transport block is to be transmitted. In other words, it is only the HARQ retransmission that is not used in NB-IoT-over-satellite technology, but other HARQ-related processing is retained.

It will be understood that methods and mechanisms described herein for HARQ retransmission by-passing are applicable to an LTE-over-Satellite system and that such an application is within the scope of the present disclosure.

Semipersistent resource allocation in NB-IoT uses a request-response method, wherein the UE 120 indicates the queue depths from its packet queues to the eNodeB 130 in a buffer status report (BSR) messaging and the eNodeB 130 uses this data in allocating radio resources to the UE 120. With satellite access, this would involve significant delays for radio resource allocation, rendering the system unusable for any user services.

The subject disclosure involves extension of a semipersistent scheduling mechanism to all UEs 120 during radio-resource control (RRC) connection transaction and updates to this resource allocation as needed through modifications to the semipersistent allocation. System-information block periodicity-system information type 1 (SIB-1) carries cell access-related information, cell-selection information, and scheduling information (scheduling information for other SIBs).

In standard NB-IoT, a fixed schedule of 256 radio frames, transmitted in SFN=4 of every other frame for 16 continuous radio frames, with a configured number of repetitions equally spaced within the 256 radio frames, is used. For SATCOM, where applications are likely to accommodate larger latencies, and where reducing overhead to increase the usable capacity is of prime importance, the present disclosure increases the periodicity of the fixed schedule to 512 or to 1,024 radio frames. The configured repetition rate will be left unchanged (16 maximum) or can be reduced to further reduce the overhead due to SIB-1.

In the traditional NB-IoT configuration, narrow-band PRACH (NPRACH) can be configured through a set of time and frequency domain parameters. Time-domain parameters include the periodicity, the starting offset and the number of repetitions. Frequency domain parameters include starting-carrier index and number of subcarriers. This scheme allows defining multiple NPRACH configurations to cater for different coverage levels, and the 3GPP work group suggests that at least three configurations covering different coverage levels be defined. The eNodeB 130 is expected to select a configuration according to the radio-frequency (RF) propagation condition of the cell.

For SATCOM, one of the three parameters (i.e., frequency band, repetitions, and periodicity) defining the resources is modified with a view of reducing the NPRACH overhead. The periodicity range can be extended from the current maximum of 2,560 milliseconds to 5,120 milliseconds or more. The subset of subcarriers (SCs) used will be the standard 12 SCs of 3.75 kHz, and the repetition range will be preserved as 1-128. However, a single repetition can be used for most of the configurations to reduce overhead.

In a standard NB-IoT configuration, the DL primary synchronization signal (NPSS) is sent every radio frame (at Subframe 5) occupying a whole subframe, and the secondary synchronization signal (NSSS) is sent every even radio frame (at Subframe 9) occupying a whole radio frame incurring an overhead of 10% and 5% of the DL payload capacity respectively. The broadcast channel (NPBCH) is sent every frame, taking up a full subframe, incurring another 10% overhead. The overhead can be reduced by half, from 20% to 10%, for example, by configuring PSSS and NPBCH to be sent in only the even radio frames and the NSSS to be sent in alternate even frames. With the reduction in NPSS/NSSS/NPBCH transmission, there will be increase in latency in UE synchronizing to a downlink carrier and overall latency in UE attaching to the network, but the impact is likely to be inconsequential in the type of use cases addressed in the NB-IoT over satellite applications.

NB-IoT as defined for terrestrial deployment supports only half duplex to lower the complexity of the UE 120 device, even though two separate frequency carriers are used in the downlink and uplink in frequency-division duplex (FDD) operation. With the specific NB-IoT half-duplex definition, there is a UE-dependent Type-B guard time of at least 1 ms between transition from receive in downlink and transmit in uplink, or vice versa, from a UE 120 device perspective. Half-duplex limits a UE from transmitting and receiving simultaneously and thus limits the uplink and downlink data rates of the UE 120. In NB-IoT-over-satellite, a UE is allowed to operate in full duplex mode, as in the LTE and LTE-over-satellite.

The UE 120 indicates its UE class when acquiring into the system, which defines its capability. If the UE 120 is full-duplex capable, the satellite eNodeB 130 may schedule simultaneous downlink and uplink resource allocations, if there is enough traffic demand. If the UE 120 is only half-duplex capable, the satellite eNodeB 130 will schedule downlink and uplink resource allocations separate in time, per NB-IoT protocol.

NB-IoT uses only binary-PSK (BPSK) and quadrature-PSK (QPSK) modulation. To support LTE services at a higher data rate over an NB-IoT-over-satellite carrier, 16-ary and 64-ary modulation are introduced for multitone transmission, that is, 180 kHz downlink and 45 kHz, 90 kHz, and 180 kHz uplink. With 16-ary and 64-ary modulation, turbo coding of the same code rates as those for 16QAM and 64QAM modulation in LTE are used. Either APSK, e.g., 16APSK or 64APSK, or QAM, e.g., 16QAM or 64QAM, modulation may be used. APSK modulation is preferred for lower waveform peak-to-average power ratio (PAPR), to improve link performance and/or lower UE 120 and satellite-amplifier required linearity performance. It is also recognized that use of 16QAM and 64QAM modulation may reduce implementation cost, because device vendors likely have QAM implementation for LTE products. The 16-ary and 64-ary MCSs are used only for those UE classes that have the capability.

The scheduler at the satellite eNodeB 130 determines in real time the MCS to use for each UE 120, depending upon UE 120 capability, channel quality, and traffic demand.

NB-IoT does not support carrier aggregation and hence the maximum bandwidth allocated to a UE is limited to the resource available on a single carrier of NB-IoT. This disclosure extends the use of LTE carrier aggregation principles with resources allocated to UEs across multiple carriers (primary and secondary). The primary carrier may be the NB-IoT carrier used by the UE 120 to access the system or a carrier that the eNodeB 130 commands the UE 120 to move to. The eNodeB 130 may allocate resources on other NB-IoT carriers to the UE as needed, and these carriers will act as the secondary carriers to that UE. This allocation mechanism will support both ad hoc downlink resource allocations on the secondary carriers and semipersistent allocation on the uplink of the secondary carriers. This scheme increases the throughput for the UE 120 with resources across multiple carriers in both uplink and downlink.

For a satellite beam where high UE data rates are not needed, for example, where only voice and IoT services are supported, an NB-IoT anchor carrier and multiple non-anchor carriers can be deployed, to reduce signaling overhead and to support a large number of UEs 120. A non-anchor carrier is a downlink carrier that does not include all the control channels and signals, such as narrow-band primary synchronization signal (NPSS), NPBCH, and SIBs, saving a minimum of 26% of time-frequency resources.

NB-IoT standards do not support handovers for connected users to maintain their existing connections. The present disclosure includes the use of intra-beam and inter-beam handover techniques to provide service continuity for connected mobile users. The technique involves measurement configuration provided to the UE 120 on the network access and feedback from the UE 120 on specially defined events indicating the result of measurements of the serving cell and the neighboring cells.

The eNodeB 130 will provide special algorithms to process the events and make a decision on handover of the UE 120 from the current serving cell to a neighboring cell. The handover messaging will use the LTE standard-defined RRC messages with extensions to allow for transfer of information to maintain the semipersistent resources allocated to the UE 120 on the current serving cell.

NB-IoT standard does not support voice over LTE as a service. The subject disclosure extends the standard to support voice real-time transport protocol (RTP) packets with RLC UM as the radio-link protocol for transport of these voice packets. The UM provides segmentation and reassembly capabilities for the voice packet to be sent across multiple transport blocks but avoids the acknowledgement messaging and retransmission of packets, which are used in the acknowledged mode of operation.

NB-IoT does not provide mechanisms for prioritization of users accessing a cell. The present disclosure extends the use of access barring mechanisms defined for standard LTE cells to the NB-IoT. eNodeB 130 broadcasts access restrictions for various classes of users depending on system conditions. These access restrictions are sent over the system-information messages, the UEs react to the access restrictions in the system-information messages by checking their class of service, and, if required, backing off from accessing the cell for a prescribed period of time.

Because the disclosed NB-IoT-over-satellite technology is a set of protocols and procedures extended from the (terrestrial) NB-IoT standard, a UE implementation can natively support both NB-IoT and NB-IoT-over-satellite. Such a UE can perform a prioritized scan of terrestrial NB-IoT downlink carriers before searching for NB-IoT-over-satellite downlink carriers. If a terrestrial NB-IoT carrier is present with sufficient quality, unless configured otherwise, the UE 120 will camp on the NB-IoT carrier and attempt to access the NB-IoT system. If the UE 120 is configured to not use the NB-IoT system, or an NB-IoT carrier is not present, the UE 120 will proceed to scan for an NB-IoT-over-satellite carrier.

Figure 2:
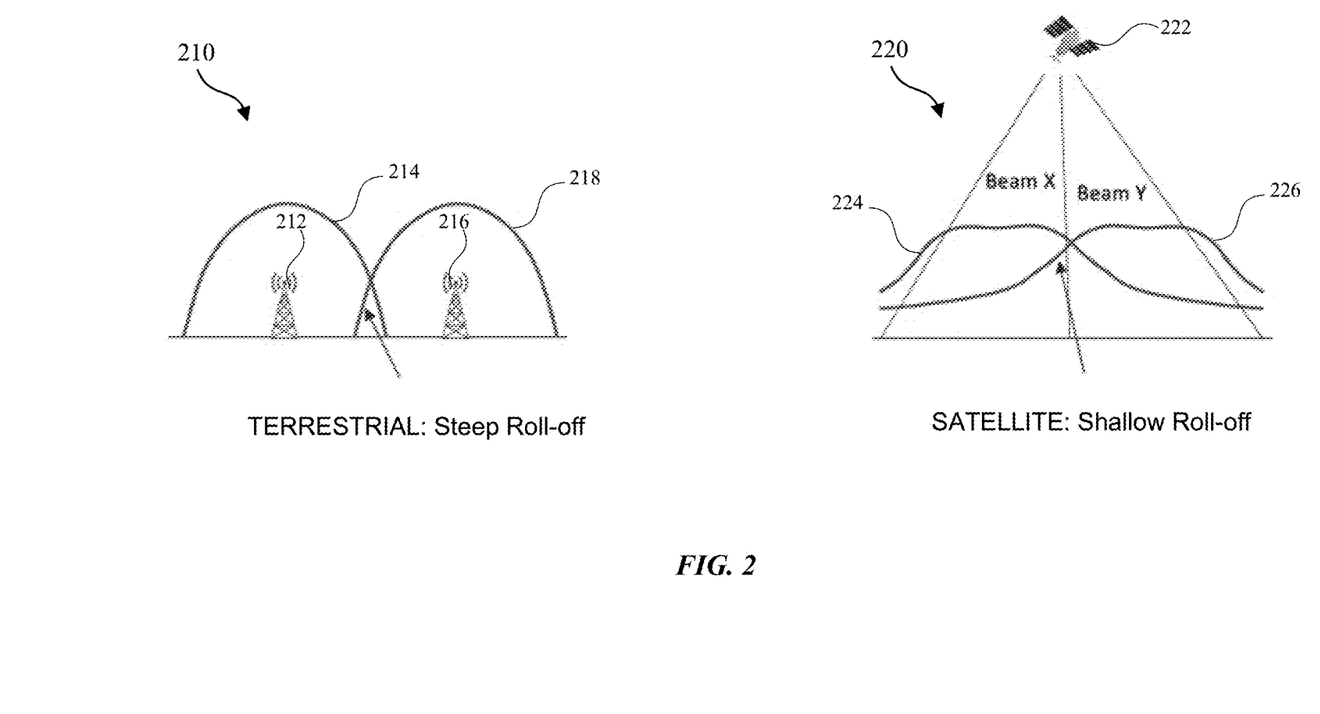
FIG. 2 is a schematic diagram illustrating examples of signal power roll-off charts for a terrestrial and a satellite NB-IoT system, according to certain aspects of the disclosure.

FIG. 2 is a schematic diagram illustrating examples of signal power roll-off charts 210 and 220 for a terrestrial and a satellite NB-IoT system, respectively, according to certain aspects of the disclosure. The chart 210 shows power signals 214 and 218 depicting signal strength variation with distance from the terrestrial base stations 212 and 216. In a terrestrial LTE or NB-IoT system, the propagation loss of the downlink signals transmitted from a base station (212 or 216) is a function of d', where d is the distance between a UE (e.g., 120 of FIG. 1) and the base station, and p typically has a value of between 3 to 5. The signal strength of the power signals 214 and 218 exhibit a sharp roll-off as the distance to base stations 212 and 216 increases. A UE, potentially in motion, takes advantage of this effect to select the best quality downlink signals and the corresponding base station to receive services.

The chart 220 shows power signals 224 and 226 depicting downlink signal strength variation with distance from the center of satellite beams X and Y of the satellite 222. In the satellite environment, especially with a GEO satellite, downlink signal strengths between adjacent beams X and Y may overlap and exhibit much shallower roll-off, as compared to the terrestrial case. The downlink carriers for different satellite beams may exhibit similar signal quality. If a UE selects a downlink carrier (and thus the paired uplink carrier) not intended for the location of that UE, unnecessary handoffs may result over time. The subject disclosure takes advantage of the fact that a UE is ordinarily equipped with a GNSS (e.g., GPS) receiver that can determine its current location. The eNodeB broadcasts cell geographic contours in anchor carriers. A UE will then select an anchor carrier with contour that the UE is inside.

It will be understood that methods and mechanisms described herein for cell selection are applicable to an LTE-over-Satellite system and that such an application is within the scope of the present disclosure.

Figure 3:
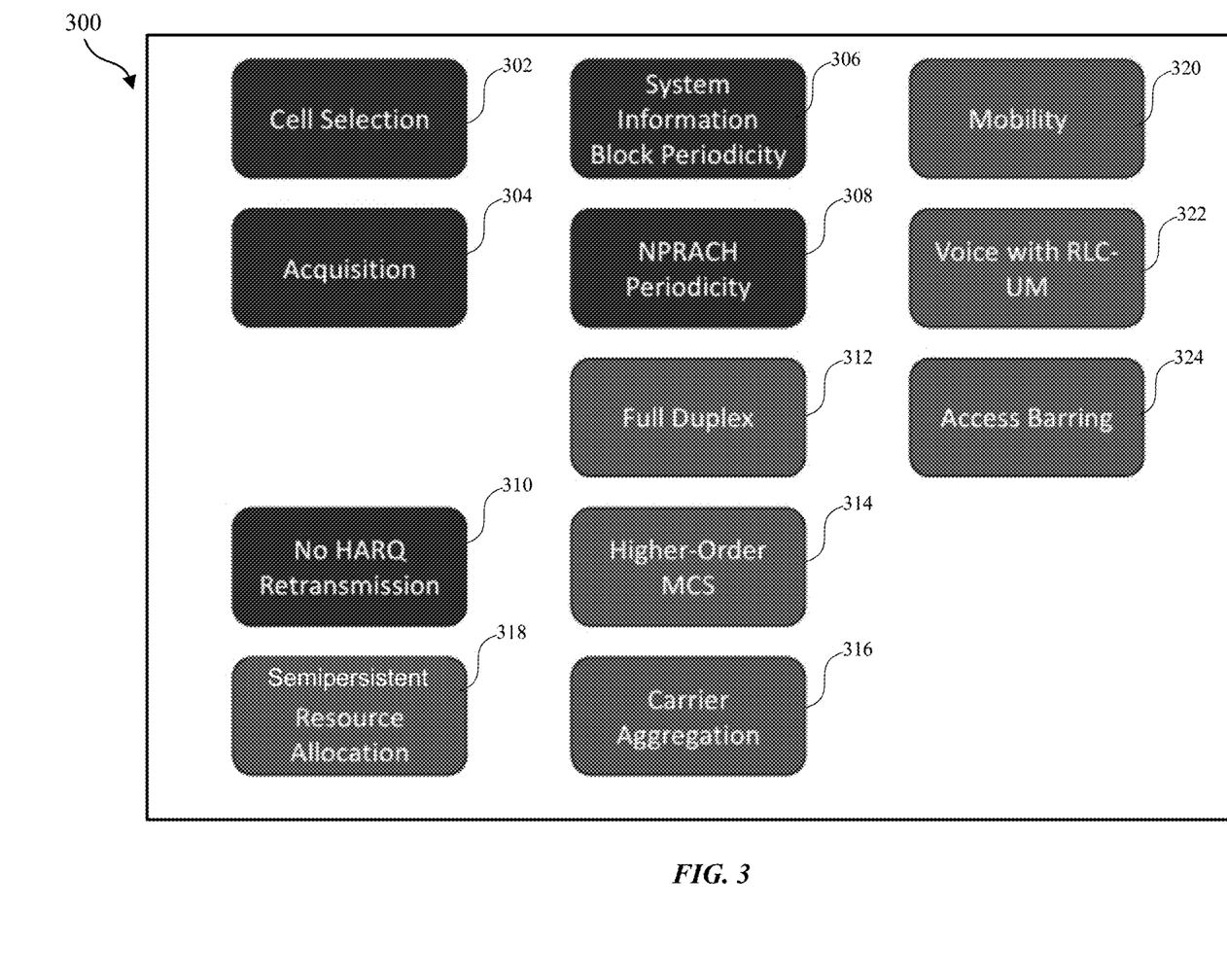
FIG. 3 is a functional block diagram illustrating examples of functional blocks of a base station of a satellite NB-IoT system, according to certain aspects of the disclosure.

FIG. 3 is a functional block diagram illustrating examples of functional blocks 300 of a base station of a satellite NB-IoT system, according to certain aspects of the disclosure. The functional blocks 300 are modules of the base station (e.g., eNodeB 130 of FIG. 1) and can be implemented in software or firmware that can be executed by a local processor of the base station and are responsible for implementing the functionalities described above with respect to the satellite NB-IoT system 100 of FIG. 1 or related functionalities. The functional blocks 300 include a first group of modules consisting of a cell-selection module 302, an acquisition module 304, a SIB periodicity module 306, an NPRACH periodicity 308 and a no-HARQ retransmission 310, which are modules from the legacy NB-IoT that are modified by the subject technology. The functional blocks 300 further include a second group of modules consisting of a full-duplex module 312, a higher-order MCS module 314, a carrier-aggregation module 316, a semipersistent resource-allocation module 318, a mobility module 320, a voice with RLC-UM module 322 and an access-barring module 324.

The cell-selection module 302 is responsible for broadcasting the cell/beam contour information in the form of a new system-information block in each anchor carrier. The cell selection is the process for a user UE (e.g., 120 of FIG. 1) to select and synchronize to a downlink carrier transmitted from an eNodeB (e.g., 130 of FIG. 1). This is the first step for the UE to connect to the satellite system. To let a UE select a downlink carrier intended for the beam that the UE is in, among similar-quality carriers from several nearby beams, an additional periodically broadcasted SIB that contains the cell/beam contour information is sent down on each downlink carrier. For a downlink carrier with good quality, a UE additionally checks whether it is within the cell/beam contour to confirm that the selected cell is correct.

The acquisition is the process by which UE performs time synchronization with the system in the return direction so that the UE can transmit in the uplink toward eNodeB without colliding (i.e., interfering) time-wise with transmissions from other UEs on the same carrier. The acquisition module 304 is responsible for synchronizing SFN to GPS time such that SFN=0 corresponds to a fixed GPS time epoch such as 2020 Jan. 1—00:00:00. The acquisition module 304 also processes received NPRACH in the same way an NPRACH is processed in terrestrial NB-IoT.

The SIB periodicity module 306 is responsible for reducing system information broadcast overhead for providing LTE-like services (larger amount of data per session but fewer terminals) in a SATCOM system. The SIB type 1 (SIB-1) carries cell-access-related information, cell-selection information, and scheduling information (scheduling information for other SIBs). The overhead is reduced from 5% to 2.5% (schedule changed from 256 frames to 512 radio frames) and to 1.25% (for 1,024 radio frames).

The NPRACH periodicity module 308 reduces NPRACH overhead for providing LTE-like services (larger amount of data per session but fewer terminals) in a SATCOM system. In the traditional NB-IoT configuration, NPRACH can be configured through a set of time-and-frequency domain parameters. Time-domain parameters include the periodicity, a starting offset and the number of repetitions. The configuration allows providing a sufficient number of opportunities available for a given number of access attempts possible with the terminals present so that an acceptable rate of collision is achieved. The subject technology extends the periodicity range from the current maximum of 2,560 milliseconds to about 5,120 milliseconds or more, reducing the overhead due to NPRACH from 15% to about 0.25% or less. The reduction in overhead can benefit the system where the number of RACH attempts is low (low number of terminals), mitigating the impact of increased collisions.

The no-HARQ retransmission module 310 is responsible for eliminating the use of HARQ retransmission for all NB-IoT data transport while achieving the same resiliency through tightening the per-MCS BLER operating point from 0.1 to between 0.01 and 0.001. This is because the HARQ requirements of NB-IoT do not work with the latency associated with the satellite, as described above.

The full-duplex module 312 is a new addition by the subject technology that enables simultaneous allocation of resources in both downlink and uplink for full-duplex transmission and reception when the UE is of a class that is capable of supporting a high data rate.

The high-order MCS module 314 is a new feature of the subject technology that starts transmission in the assigned MCS, when assignment for 16-ary or 64-ary MCS is received. This can happen when (1) the UE is of a class that is capable of supporting a high data rate; (2) the UE is allocated multitone resources in uplink; and (3) the link condition is sufficient in uplink, then the request for 16-ary and 64-ary modulation (e.g., 16QAM or 16APSK and 64QAM or 64APSK) is transmitted.

The carrier aggregation module 316 is an additional capability introduced by the subject disclosure to extend the use of carrier-aggregation principles with resources allocated to the UEs across multiple carriers (primary and secondary). The primary carrier is the NB-IoT carrier used by the UE to access the system, and the eNodeB will allocate resources on the secondary NB-IoT carriers to the UE as needed. This allocation mechanism can support both ad hoc downlink resource allocations on the secondary carriers and the semipersistent allocation on the uplink of the secondary carriers. This scheme increases the throughput for the UE with resources across multiple carriers in both uplink and downlink.

The semipersistent resource allocation module 318, as a feature of the subject technology, is responsible for extension of semipersistent scheduling mechanism to all UEs during RRC connection transaction and updating this resource allocation as needed through modifications to the semipersistent allocation. It is understood that the resource allocation in NB-IoT uses a request-response method, wherein the UE indicates the queue depths from its packet queues to the eNodeB in a BSR messaging and the eNodeB uses this data in allocating radio resources to the UE. With satellite access, this would involve significant delays for radio resource allocation rendering the system unusable for any user services.

The mobility module 320 is an added feature of the present disclosure that extends the use of intra-beam and inter-beam handover techniques to provide service continuity for connected mobile users. The technique involves measurement configuration provided to the UE on the network access and feedback from the UE on specially defined events, indicating the result of measurements of the serving cell and the neighboring cells. The eNodeB will provide special algorithms to process the events and make a decision on handover of the UE from the current serving cell to a neighboring cell. The handover messaging extensions allow for transfer of information to maintain the semipersistent allocations allocated to the UE on the current serving cell.

The voice with RLC-UM module 322 of the subject technology extends the standards to support voice RTP packets with RLC-unacknowledged mode as the radio-link protocol for the transport. The unacknowledged mode provides segmentation and reassembly capabilities for the voice packet to be sent across multiple transport blocks but avoids the acknowledgement messaging and retransmission of packets, which are used in the acknowledged mode of operation.

The access-barring module 324 is a feature of the subject technology that extends the use of access-barring mechanisms defined for standard LTE cells to NB-IoT cells, which provides for eNodeB-broadcasted access restrictions for various classes of users depending on the system conditions. These access restrictions are sent over system-information messages and the UEs react to the access restrictions in the system-information messages by checking their class of service and, if required, backing off from accessing the cell for a prescribed period.

Figure 4:
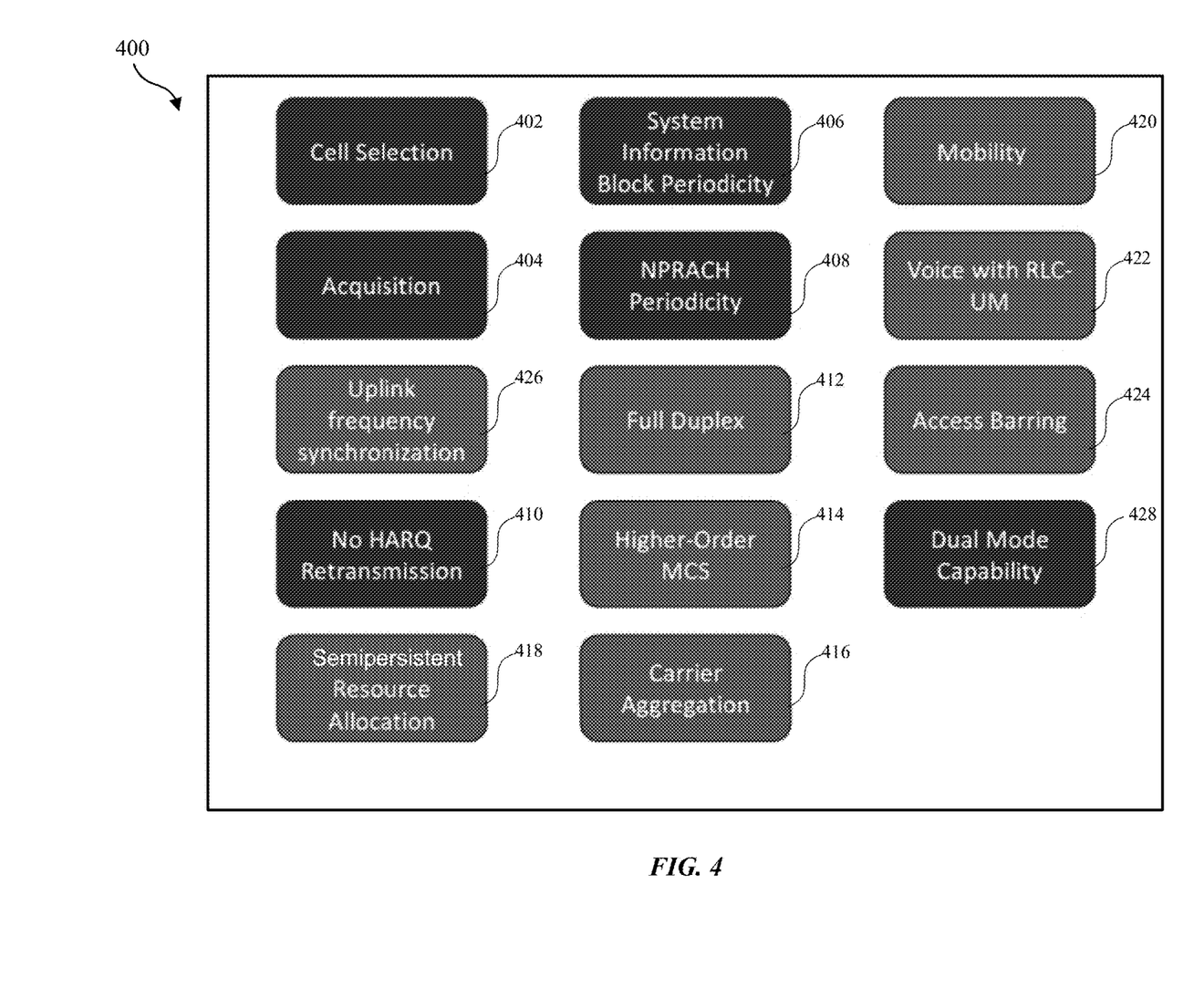
FIG. 4 is a functional block diagram illustrating examples of functional blocks of a satellite terminal of a satellite NB-IoT system, according to certain aspects of the disclosure.

FIG. 4 is a functional block diagram illustrating examples of certain functional blocks 400 of a satellite terminal of a satellite NB-IoT system, according to certain aspects of the disclosure. The functional blocks 400 are implemented by software and/or firmware embedded in a satellite terminal (e.g., a UE 120 of FIG. 1) and executed by a local processor of the UE 120 of the satellite NB-IoT system 100 of FIG. 1. The functional blocks 400 implement the functionalities described above with respect to the satellite NB-IoT system 100 or related functionalities. The functional blocks 400 include a first group of modules consisting of a cell-selection module 402, an acquisition module 404, a SIB periodicity module 406, an NPRACH periodicity module 408, a no-HARQ retransmission module 410 and a dual-mode capability module 428, which are modules from the legacy NB-IoT that are modified by the subject technology. The functional blocks 400 further include a second group of modules consisting of a full-duplex module 412, a higher-order MCS module 414, a carrier-aggregation module 416, a semipersistent resource-allocation module 418, a mobility module 420, a voice with RLC-UM module 422, an access-barring module 424 and an uplink-frequency synchronization module 426, which are new relative to standard NB-IoT.

The cell-selection module 402 is responsible for obtaining cell/beam contour information from the eNodeB and decoding the information and using it to determine the proper cell to camp on, in addition to using signal quality metrics.

The acquisition module 404 is responsible for measuring downlink frame arrival GPS time, deriving downlink frame transmit GPS time (from satellite eNodeB) and transmission of NPRACH with a timing advance derived from the downlink frame arrival GPS time and the downlink frame transmit GPS time instances.

The SIB periodicity module 406 is responsible for increasing the time span between two consecutive SIB broadcasts, thus achieving reduced overhead for SIB, and the concomitant increase in the latency for a UE to attach to the system. For the user application scenarios envisaged, this increase latency is unlikely to be consequential.

The NPRACH periodicity module 408 is responsible for allowing different periodicities for different cells, enabling call-rate intensive cells to be configured with shorter periodicity. While the delay for a terminal to attach may be increased, the mix of terminal types expected in the user population lends itself to decreasing the RACH opportunities available (longer periodicity) without any appreciable increase in collision rates.

The no-HARQ retransmission module 410 eliminates the use of HARQ retransmission for all data transmissions, while achieving the same resiliency through tightening the per-MCS BLER operating point from 0.1 to about between 0.01 and 0.001. Note that the HARQ requirements of NB-IoT do not work with satellite latency.

The full-duplex module 412 is a new addition by the subject technology that transmits and receives in both downlink and uplink even if they may be simultaneous. The full-duplex feature would be available if the terminal is of a class that is capable of supporting a high data rate.

The higher-order MCS module 414 is a new feature of the subject technology that starts transmission in the assigned MCS, when assignment for 16-ary or 64-ary MCS is received. This can happen when (1) the UE is of a class that is capable of supporting a high data rate; (2) the UE is allocated multitone resources in uplink; and (3) the link condition is sufficient in uplink, then the request for 16-ary and 64-ary modulation (e.g. 16QAM or 16APSK and 64QAM or 64APSK) is transmitted.

The carrier-aggregation module 416 is an addition capability introduced by the subject disclosure to extend the use of carrier-aggregation principles with resources allocated to the UEs across multiple carriers (primary and secondary). The primary carrier is the NB-IoT carrier used by the UE to access the system, and the eNodeB allocates resources on secondary NB-IoT carriers to the UE as needed. This allocation mechanism supports both ad hoc downlink resource allocations on secondary carriers and semipersistent allocation on the uplink of secondary carriers. This scheme increases the throughput for the UE with resources across multiple carriers in both uplink and downlink.

The semipersistent resource allocation module 418, as a feature of the subject technology, is responsible for the extension of a semipersistent scheduling mechanism to all UEs during RRC connection transaction and updating this resource allocation as needed through modifications to the semipersistent allocation. It is understood that the resource allocation in standard NB-IoT uses a request-response method, wherein the UE indicates the queue depths from its packet queues to the eNodeB in a BSR messaging, and the eNodeB uses this data in allocating radio resources to the UE. With satellite access, this would involve significant delays for radio resource allocation, rendering the system unusable for any user services.

The mobility module 420 is an added feature of the present disclosure that extends the use of intrabeam and interbeam handover techniques to provide service continuity for connected mobile users. The technique involves measurement configuration provided to the UE on the network access and feedback from the UE on specially defined events, indicating the result of measurements of the serving cell and the neighboring cells. The eNodeB provides special algorithms to process the events and make a decision on handover of the UE from the current serving cell to a neighboring cell. The handover messaging extensions allow for transfer of information to maintain the semipersistent allocations allocated to the UE on the current serving cell.

The voice with RLC-UM module 422 of the subject technology extends the standards to support voice RTP packets with RLC-unacknowledged mode as the radio-link protocol for the transport of these voice packets. The unacknowledged mode provides segmentation and reassembly capabilities for the voice packet to be sent across multiple transport blocks but avoids the acknowledgement messaging and retransmission of packets, which are used in the acknowledged mode of operation.

The access-barring module 424 is a feature of the subject technology that extends the use of access-barring mechanisms defined for standard LTE cells to NB-IoT cells, which provide for eNodeB broadcasted-access restrictions for various classes of users depending on the system conditions. These access restrictions are sent over system-information messages, and the UEs react to the access restrictions in the system information messages by checking their class of service and, if required, backing off from accessing the cell for a prescribed period.

The uplink-frequency synchronization module 426 enables the UE to determine to an uplink frequency offset, as described above with respect to FIG. 1, and to transmit an uplink carrier at the nominal frequency subtracted by the uplink-frequency offset.

The dual-mode capability module 428 is responsible for the dual-mode operation of the UE that allows the UE to camp on and use a terrestrial coverage for service. When the terrestrial NB-IoT coverage is detected, the UE camps on a satellite cell to receive service, when the terrestrial NB-IoT coverage is lost or not detected.

Figure 5:
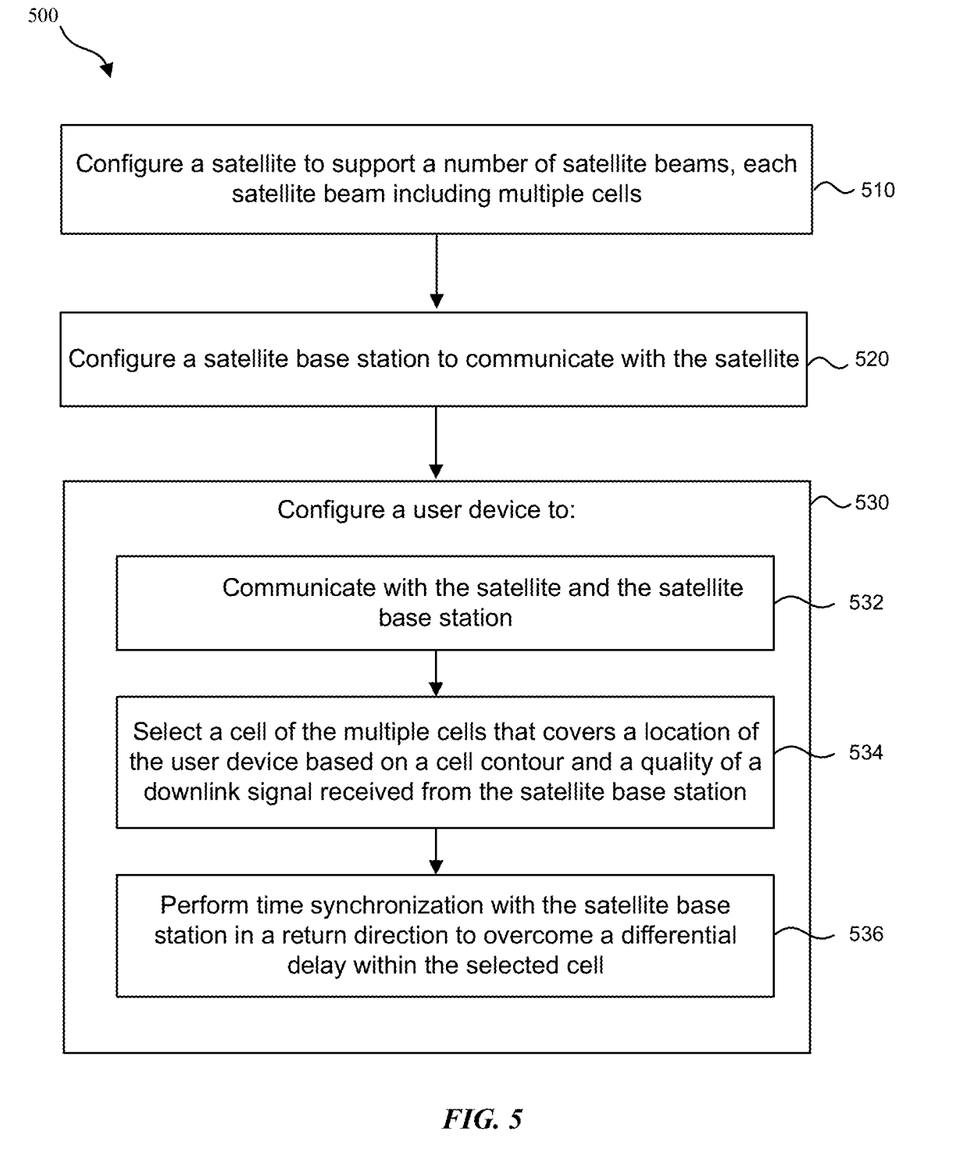
FIG. 5 is a flow diagram illustrating an example method of providing an NB-IoT-over-satellite system, according to certain aspects of the disclosure.

FIG. 5 is a flow diagram illustrating an example method 500 of providing an NB-IoT-over-satellite system (e.g., 100 of FIG. 1), according to certain aspects of the disclosure. The method 500 includes configuring a satellite (e.g., 102 of FIG. 1) to support a plurality of satellite beams (e.g., with carriers 110-1, 110-2, 110-3 and 110-4 of FIG. 1), each satellite beam including multiple cells (e.g., 110) (510). The method 500 also includes configuring a satellite base station (e.g., 130 of FIG. 1) to communicate with the satellite (520). The method 500 further includes configuring a user device (e.g., 120 of FIG. 1) (530) to communicate with the satellite and the satellite base station (532), select a cell of the multiple cells that covers a location of the user device based on a cell contour and a quality of a downlink signal received from the satellite base station (534), and perform time synchronization (e.g., using 424 of FIG. 4) with the satellite base station in a return direction to overcome a UE-to-eNodeB time delay within the selected cell (536).

Figure 6:
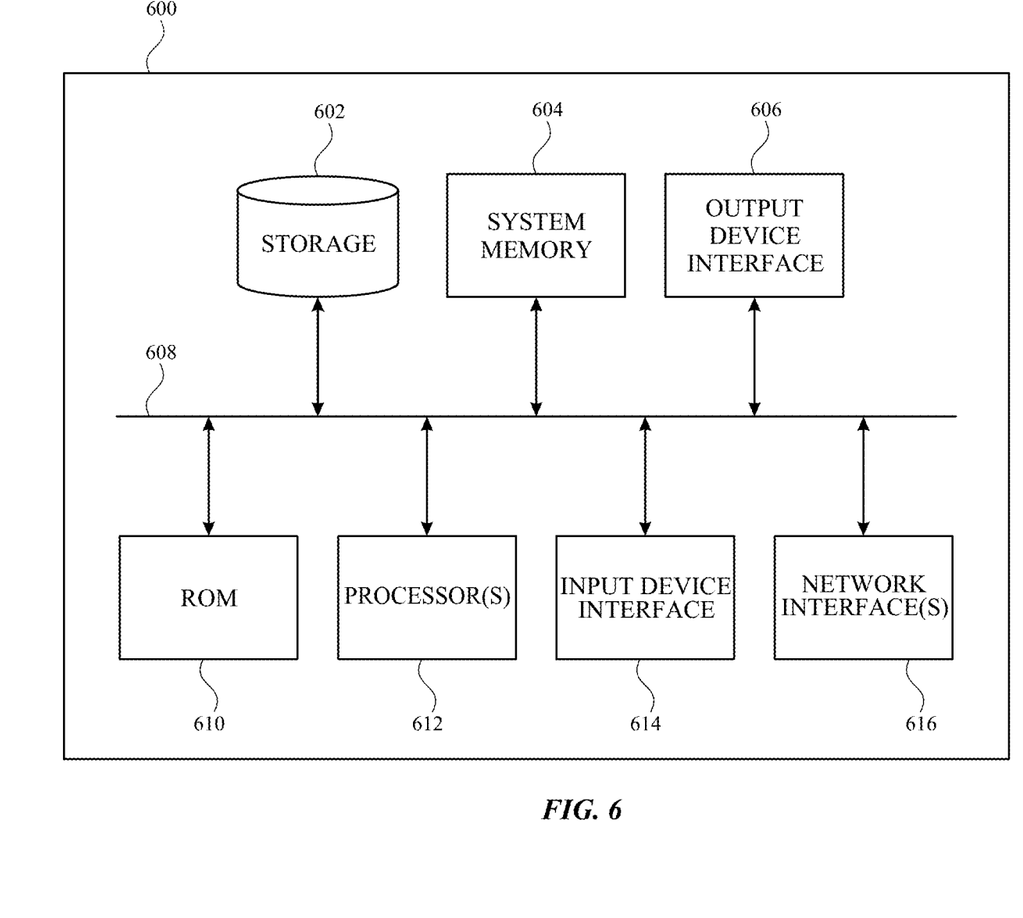
FIG. 6 conceptually illustrates an electronic system with which some aspects of the subject technology can be implemented.

FIG. 6 conceptually illustrates an electronic system with which some aspects of the subject technology can be implemented. The electronic system 600, for example, can be a UE (e.g., UE 120 of FIG. 1), such as a phone, a personal digital assistant, a laptop computer, a tablet or a desktop computer, a base station (e.g., 130 or 124 of FIG. 1), a server, a switch, a router, a receiver or any device that can control and/or perform processing of data including aggregation of data, or generally any electronic device that transmits signals over a network. Such an electronic system includes various types of computer-readable media and interfaces for various other types of computer-readable media. Electronic system 600 includes bus 608, Processor (s) 612, system memory 604, read-only memory (ROM) 610, permanent storage device 602, input device interface 614, output device interface 606, and network interface 616, or subsets and variations thereof.

Bus 608 collectively represents all system, peripheral, and chipset buses that communicatively connect the numerous internal devices of electronic system 600. In one or more implementations, bus 608 communicatively connects Processor (s) 612 with ROM 610, system memory 604, and permanent storage device 602. From these various memory units, Processor (s) 612 retrieve(s) instructions to execute and data to process in order to execute the processes of the subject disclosure. The Processor(s) 612 can be a single processor or a multicore processor in different implementations.

ROM 610 stores static data and instructions that are needed by Processor (s) 612 and other modules of the electronic system. Permanent storage device 602, on the other hand, is a read-and-write memory device. This device is a nonvolatile memory unit that stores instructions and data even when electronic system 600 is off. One or more implementations of the subject disclosure use a mass-storage device (such as a magnetic or optical disk and its corresponding disk drive) as permanent storage device 602.

Other implementations use a removable storage device (such as a floppy disk or flash drive, and its corresponding disk drive) as permanent storage device 602. Like permanent storage device 602, system memory 604 is a read-and-write memory device. However, unlike storage device 602, system memory 604 is a volatile read-and-write memory, such as random access memory (RAM). System memory 604 stores any of the instructions and data that Processor (s) 612 need(s) at runtime. In one or more implementations, the processes of the subject disclosure, for example, the trained ROM, are stored in system memory 604, permanent storage device 602, and/or ROM 610. From these various memory units, Processor(s) 612 retrieve(s) instructions to execute and data to process in order to execute the processes of one or more implementations. In one or more implementations, the Processor (s) 612 execute(s) the automatic processes of the subject technology, including executing functionalities of the functional blocks 300 of FIG. 3 and 400 of FIG. 4.

Bus 608 also connects to input device interface 614 and output device interface 606. Input device interface 614 enables a user to communicate information and select commands to the electronic system. Input devices used with input device interface 614 include, for example, alphanumeric keyboards and pointing devices (also called "cursor-control devices"). Output device interface 606 enables, for example, the display of images generated by electronic system 600. Output devices used with output device interface 606 include, for example, printers and display devices such as a liquid crystal display (LCD), a light-emitting diode (LED) display, an organic LED (OLED) display, a flexible display, a flat-panel display, a solid-state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback, and input from the user can be received in any form, including acoustic, speech, or tactile input.

Finally, as shown in FIG. 6, bus 608 also couples electronic system 600 to a network (not shown) through network interfaces 616. In this manner, the computer can be a part of a network of computers (such as a local-area network (LAN), a wide-area network (WAN), or an Intranet, or a network of networks, such as the Internet). Any or all components of electronic system 600 can be used in conjunction with the subject disclosure.

In some aspects, the subject technology is related to satellite communication and, more particularly, to an NB-IoT-over-satellite system. In some aspects, the subject technology may be used in various markets, including, for example, and without limitation, the signal-processing and communications markets.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks may be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single hardware and software product or packaged into multiple hardware and software products.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meanings unless otherwise explicitly and clearly defined by the patentee. If there is any conflict in the usage of a word or term in this specification and one or more patent or other documents that may be incorporated herein by reference, the definition that is consistent with this specification should be adopted.

What is claimed is:

1. A satellite communication system, the system comprising:
   a satellite configured to provide a plurality of satellite beams, each satellite beam including a plurality of cells;
   a satellite base station configured to communicate with the satellite via a feeder link; and
   a user device in communication, via the satellite, with the satellite base station using a NB-IoT protocol or an LTE protocol and configured to select a cell of the plurality of cells of a satellite beam of the plurality of satellite beams covering a location of the user device; and
   wherein,
   the user device is configured to:
      select the cell based on a cell contour and a quality of a downlink signal received from the satellite base station; and
      achieve time synchronization with the satellite base station in a return direction to overcome a differential delay within the selected cell.

2. The system of claim 1, wherein the satellite communication system comprises a narrow-band internet of things (NB-IoT) system, and wherein the user device is configured to overcome the UE-to-eNodeB time delay by utilizing a self-determined timing advance (TA), wherein the user device is configured to determine the self-determined TA by utilizing a global positioning system (GPS) time and a convention that the satellite base station transmitted system frame number (SFN) is aligned to a certain GPS time epoch.

3. The system of claim 1, wherein the user device is configured to perform satellite uplink-frequency synchronization to overcome motion-induced Doppler-frequency effect and to determine a satellite-uplink transmission frequency.

4. The system of claim 1, wherein the user device selects a beam based on beam contour and a quality of a downlink signal received from the satellite base station.

5. The system of claim 1, wherein the satellite base station and the user device are configured to select a modulation and coding scheme that achieves a low block-error ratio of less than about 1 percent to 0.1 percent instead of performing a hybrid automatic retransmission request (HARD) procedure of a terrestrial NB-IoT.

6. The system of claim 5, wherein the satellite base station and the user device are configured to use a semipersistent resource-allocation scheme that allows dynamic resource allocation during a radio-resource control (RRC) connection between the user device and the satellite base station, and wherein an NB-IoT physical random-access channel (NPRACH) overhead is reduced by extending a periodicity range.

7. The system of claim 1, wherein the satellite communication system comprises a narrow-band internet of things (NB-IoT) system, and wherein an overhead of an NB-IoT Primary Synchronization Signal (NPSS), an overhead of a Secondary Synchronization Signal (NSSS), and an overhead of an NB-IoT Broadcast Channel (NPBCH) are reduced by extending their respective periodicity.

8. The system of claim 1, wherein an NB-IoT SIB1 overhead is reduced by extending a periodicity range of SIB1.

9. The system of claim 1, wherein the user device is configured to operate either at half duplex or full duplex, with full duplex supporting a higher data rate than allowed by an NB-IoT protocol.

10. The system of claim 1, wherein the user device and the base station support 16-ary and 64-ary modulation schemes to support higher data rate than allowed by NB-IoT protocol.

11. The system of claim 1, wherein the satellite base station includes a scheduler configured to determine in real time a modulation and coding scheme (MCS) based on capabilities of the user device, and wherein the satellite base station is configured to support user-device beam-to-beam handovers to provide service connectivity for the user device.

12. The system of claim 1, wherein the satellite base station and the user device are configured to support voice-over-satellite by using NB-IoT-based waveforms and protocols that allow transport of voice real-time transport protocol (RTP) packets in a radio-control link (RLC)-unacknowledged mode.

13. The system of claim 1, wherein the satellite base station and the user device are configured to support differentiated access privilege to allow prioritization of the user device in accessing a cell of the plurality of cells.

14. The system of claim 1, wherein the user device is configured to access a terrestrial NB-IoT network as well as an NB-IoT-over-satellite network.

15. A method of operating a satellite communication system, the method comprising:
   configuring a satellite to support a plurality of satellite beams, each satellite beam including multiple cells;
   configuring a satellite base station to communicate with the satellite; and
   configuring a user device to:
      communicate with the satellite and the satellite base station using an LTE protocol;
      select a cell of the multiple cells that covers a location of the user device based on a cell contour and a quality of a downlink signal received from the satellite base station; and
      perform time synchronization with the satellite base station in a return direction to overcome a UE-to-eNodeB time delay within the selected cell.

16. The method of claim 15, wherein the method further comprises configuring the user device to perform satellite uplink-frequency synchronization to overcome motion-induced Doppler-frequency effect and to determine a satellite-uplink transmission frequency.

17. The method of claim 15, further comprising configuring the satellite base station and the user device to select a modulation and coding scheme that achieve a low block-error ratio of less than about 1 percent to 0.1 percent instead of performing a HARQ retransmission procedure of a terrestrial LTE.

18. The method of claim 15 further comprising configuring the user device to
   access a terrestrial LTE network as well as an LTE-over-satellite network.

19. A satellite base station comprising:
   a processor circuit configured to perform following actions:

controlling communications with a satellite and a user device using an NB-IoT protocol or an LTE protocol;

configuring a satellite base station and the user device to select a modulation and coding scheme that achieve a low block-error ratio of less than about 1 percent to 0.1 percent without performing a HARQ retransmission procedure of a terrestrial LTE.

20. The satellite base station of claim 19, wherein the processor circuit is further configured to:

determine in real time an MCS based on capabilities of the user device;

support user-device beam-to-beam handovers to provide service connectivity for the user device;

support voice-over-satellite by using NB-IoT-based waveforms and protocols that allow transport of voice RTP packets in an RLC-unacknowledged mode; and support differentiated access privilege to allow prioritization of the user device in accessing a cell of multiple cells.

* * * * *